United States Patent [19]

Bartholomew et al.

[11] 4,075,899

[45] Feb. 28, 1978

[54] OPERATING MECHANISMS

[76] Inventors: Jack Leonard Bartholomew, 5 Newick Drive, Newick, Sussex; Derek John Bristow, Jackies Lane, Freshwater, Newick, Sussex, both of England

[21] Appl. No.: 688,393

[22] Filed: May 20, 1976

[30] Foreign Application Priority Data

May 30, 1975 United Kingdom ............... 23553/75

[51] Int. Cl.² ............................................ F16H 21/44

[52] U.S. Cl. .................................... 74/102; 74/99 A; 74/107; 251/297; 74/53

[58] Field of Search ................... 74/107, 53, 57, 99 A, 74/102; 251/297, 158, 204

[56] References Cited

U.S. PATENT DOCUMENTS

| | | | |
|---|---|---|---|
| 170,648 | 11/1875 | Upham | 251/204 |
| 2,188,763 | 1/1940 | Swan | 74/99 A |
| 2,569,967 | 10/1951 | Ashton | 251/297 X |
| 2,615,177 | 10/1952 | Schlichting | 251/297 X |
| 2,977,086 | 3/1961 | Heinen | 251/167 |
| 3,228,493 | 1/1966 | Kershner | 74/107 X |

*Primary Examiner*—Clarence R. Gordon
*Attorney, Agent, or Firm*—Eyre, Mann, Lucas & Just

[57] ABSTRACT

This invention relates to operating mechanisms for hydraulic control systems and it is an object of the invention to provide an operating mechanism which is self-locking. The mechanism includes a bar which is slidable in a channel, one face of the bar being cut away to provide two inclined surfaces. Rollers are retained by springs in the spaces between the inclined surfaces and one side of the channel. A plate is also located between the bar and the said side of the channel and a control member serves to displace this plate along the channel. The arrangement is such that, when the plate is displaced in either direction, it pushes a respective one of the rollers towards one end of the bar, thereby allowing it to roll down the inclined surface. On the other hand, if a force is applied to the bar in either direction, a respective one of the rollers will move up the inclined surface and wedge against the side of the channel, thereby locking the bar in position.

14 Claims, 1 Drawing Figure

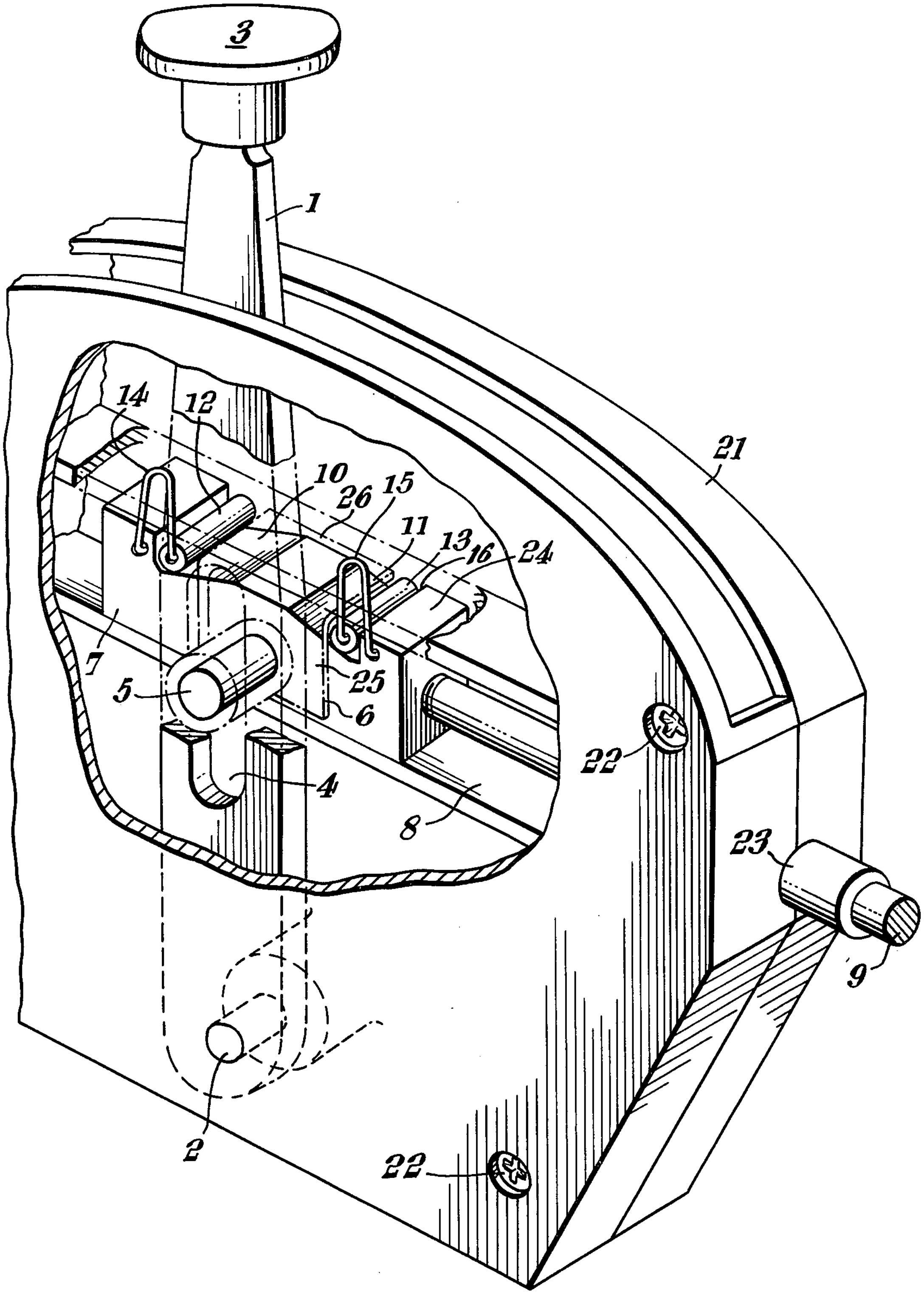
3
1
14
12
10
26
15
11
13
16
24
21
7
5
25
6
22
4
8
23
9
2
22

OPERATING MECHANISMS

This invention relates to operating mechanisms and is particularly concerned with operating mechanisms for hydraulic control systems.

In hydraulic control systems it is frequently desirable that the hydraulic system shall be capable of being controlled by a manually operated lever, but that the control system itself should be incapable of moving the lever. In other words, the lever should lock in any position to which it is moved by the operator. For this purpose some operating levers have in the past been provided with a manually operated locking mechanism. For example, a rotatable knob may be provided at the end of the operating lever and rotation of this knob may be used to operate a locking mechanism.

It is an object of the present invention to provide an operating mechanism which is self-locking, so that it is unnecessary for the operator to carry out an unlocking action each time he wishes to move the lever, and a locking action when he has completed the required movement.

From one aspect the invention consists in an operating mechanism, including an input member and an output member located in a guide member, wherein the application of an operating force to said input member produces limited displacement of the input member relative to the output member, wherein the output member includes at least one surface carrying at least one ball or roller and inclined so that it converges on a surface of the guide member, with the result that a force applied to the output member causes the ball or roller to roll towards the converging end of the inclined surface and thus to lock the output member to the guide member, and wherein the input member is provided with an abutment which urges the ball or roller away from said converging end when the input member is displaced relative to the output member by said operating force.

Preferably, the output member includes two inclined surfaces with their converging ends adjacent to one another and each carrying at least one ball or roller. Thus, a force applied to the output member in one direction causes one of the balls or rollers to roll towards the converging end of the inclined surface by which it is carried, while a force acting in the opposite direction causes the other ball or roller to roll towards the converging end of its inclined surface.

In one particular embodiment of the invention, the guide member is in the form of a longitudinally extending channel and the output member is attached to one end of a shaft, which is guided for linear motion. The output member is generally in the form of a bar of square cross section, one rectangular face of the bar being cut away to provide the two inclined surfaces, which meet in a line extending across the bar substantially in the central plane thereof.

In this embodiment the input member may be substantially in the form of a stirrup having a generally flat central portion extending between two end portions perpendicular to said central portion. When the input and output members are assembled, the central portion of the stirrup is parallel with one of the sides of the bar perpendicular to the side carrying the two inclined surfaces. The said central portion of the input member is slightly longer than the bar and the end portions of the stirrup are provided with holes, which cooperate with spigots projecting from the ends of the bar, so that the stirrup has limited freedom of movement relative to the bar in the direction of the longitudinal axis of the bar. If desired, the shaft may extend directly from one end of the bar and in this case one of the spigots is replaced by the shaft to provide the required support for the stirrup. The stirrup also includes a flat abutment portion perpendicular both to said flat central portion and to said two end portions and located midway between the two end portions. When the members are assembled, this abutment portion is located substantially in the place of the side of the bar which is cut away to provide the two inclined surfaces. The two parallel free edges of the abutment portion constitute the abutments which displace the rollers to release the locking action when the operating force is applied to the input member.

In an alternative arrangement the input member is constituted solely by an angle plate, one portion of which constitutes the abutment plate already described and the other portion of which is perpendicular to the abutment plate and replaces the flat central portion of the stirrup. In this case limitation of the relative movement of the input and output members is provided solely by the abutments, the rollers and shoulders provided in the bar at the outer ends of the two inclined surfaces.

A control member is connected to the stirrup or the angle plate and, if desired, this control member may be in the form of a lever. The lever is pivotally mounted at one end and provided with an operating knob or handle or the like at the other end. A slot is provided intermediate the two ends of the lever and a pin attached to the centre of the stirrup is slidable in this slot, so that arcuate movement of the lever produces linear motion of the input and output members in the guide member.

Preferably, springs are provided to urge the two rollers towards their respective converging ends, so that the output member remains locked to the guide member so long as no operating force in either direction is applied to the control lever.

One method of performing the invention will now be described with reference to the accompanying diagrammatic drawing, which is a perspective view of part of one embodiment of the invention.

The embodiment illustrated includes a two-part housing 21, the two parts of which are interconnected by screws such as those shown at 22. The side of the housing is shown broken away to enable the mechanism to be seen. This mechanism includes an operating lever 1, pivotally mounted on a fulcrum pin 2 fitted in the housing 21. The lever is provided at its free end with a knob and is also provided with a slot 4 to receive a pin 5 projecting from one arm 25 of an angle member 6, the other arm of which constitutes a release plate 26.

The mechanism further includes a sliding block 7 guided in a channel 8, which is also shown broken away to reveal the details of the mechanism. A shaft 9 is attached to one end of the block 7 and is guided for linear motion in a bearing which is secured between the two parts of the housing.

One side of the sliding block 7 is cut away to provide two inclined surfaces 10 and 11 and rollers 12 and 13 are located on these inclined surfaces. They are urged by springs 14 and 15 towards the centre of the sliding block and it will be seen that in this position each of the rollers provides a wedging action between its respective inclined surface and the adjacent wall 24 of the channel 8.

The two parallel free edges of the release plate 26 are adjacent to respective ones of the rollers 12 and 13 and it will be seen, for example, that, if the lever 1 is moved in a clockwise direction as seen in the drawing, the right-hand edge of the release plate 26 will displace the roller 13 against the action of the spring 15, so that it descends the inclined surface 11 and is forced against a shoulder 16 formed in the block 7. Thus, the force that tends to produce the clockwise motion of the lever 1 is transmitted through the pin 5, the angle member 6, the roller 13 and the shoulder 16, to displace the block 7 and hence the shaft 9 to the right with respect to the channel 8. Anti-clockwise motion of the lever 1 will displace the block 7 and the shaft 9 to the left in a similar manner.

What is claimed is:

1. An operating mechanism comprising:

a housing;

a guide member in said housing;

an output member slidable in said guide member;

a surface on said guide member adjacent said output member at all slidable positions thereof;

said output member including at least one surface inclined so that it converges toward said surface of the guide member whereby a maximum and minimum separation distance exists therebetween;

at least one rolling means located between the inclined surface of the output member and said surface of the guide member;

the diameter of said rolling means being intermediate the maximum and minimum separation distances between said inclined surface and said surface of the guide member;

means for urging said rolling means along said inclined surface toward said minimum separation distance;

input means;

said input means being operative when actuated to displace said rolling means toward said maximum separation distance;

means operative to apply force to said output member upon actuation of said input means whereby displacement of said output member is urged; and said means for urging being further operative to resume urging said rolling means into jamming abutment upon termination of actuation.

2. A mechanism as claimed in claim 1, wherein the output member includes two inclined surfaces, the converging ends of which are adjacent to one another; and wherein each of said inclined surfaces carries at least rolling means.

3. A mechanism as claimed in claim 2, wherein the guide member is a longitudinally extending channel;

wherein the output member is a bar slidable in said channel; and wherein one face of said bar is shaped to provide the two inclined surfaces which meet in a line extending across the bar substantially in the central plane thereof.

4. An operating mechanism comprising:

a housing;

a guide channel in said housing;

a bar slidable in said channel, one face of said bar being shaped to provide two inclined surfaces;

said guide channel having a bearing surface facing said two inclined surfaces at all slidable positions of said bar defining a maximum and minimum separation distance between each of said two inclined surfaces and said bearing surface;

an input member;

means for applying an operating force to said input member;

at least one rolling means located between each of said inclined surfaces and said bearing surface;

the diameter of said rolling means being intermediate the maximum and minimum separation distances between each said inclined surfaces and said bearing surface;

means for urging said rolling means toward said minimum separation distances;

said input member being provided with means for urging one of said rolling means toward said maximum separation distance upon actuation thereof;

means for applying displacing force to said bar; and said means for urging being operative upon the termination of actuation to again urge the displaced rolling means toward said minimum separation distance.

5. A mechanism as claimed in claim 4, further comprising a shoulder on the bar at one end of each of said inclined surfaces in such positions that limitation of the relative movement of the input member and the bar in each direction is provided by inter-engagement of one of said abutments, on the rolling means, and one of the shoulders.

6. A mechanism as claimed in claim 4, wherein said means for urging comprises at least one spring operative to urge each of said rolling means towards the central plane of the bar.

7. An operating mechanism comprising:

a housing;

a guide channel in said housing;

a bar slidable in said channel, one face of said bar being shaped to provide two inclined surfaces;

a bearing surface in said guide channel facing said two inclined surfaces whereby minimum and maximum separation distances between said bearing surface and said two inclined surfaces are defined;

two rollers one located between each of said inclined surfaces and the bearing surface, said rollers having diameters intermediate said maximum and minimum separation distances;

means for urging said rollers toward said minimum separation distance;

a stirrup in said channel between said inclined surfaces and said bearing surface;

means for applying force to said stirrup along the axis of the bar; and abutment means on said stirrup for displacing one of said rollers toward said maximum separation distance when urged in a first direction and the other of said rollers when urged in the second direction.

8. An operating mechanism comprising a guide channel;

a bar slidable in said channel, one face of said bar being shaped to provide two inclined surfaces;

a bearing surface in said channel facing said two inclined surfaces defining maximum and minimum separation distances;

two rollers one located between each of said inclined surfaces and said bearing surface;

said rollers having diameters intermediate said minimum and maximum separation distances;

an angle member having first and second perpendicular portions, said first portion constituting an abutment plate located between said inclined surfaces and said bearing surface; and a control member connected to said second portion of said angle member;

said abutment plate having two parallel free edges adapted to displace said rollers when an operating force is applied to said control member.

9. A mechanism as claimed in claim 8, wherein the control member is a lever which is pivotally mounted at one end and provided with an operating handle at the other end.

10. A mechanism as claimed in claim 9, wherein the lever includes a slot located at an intermediate point between the two ends of the lever, and wherein a pin attached to the center of said other portion of the angle member is slidable in said slot so that arcuate movement of the lever produces linear motion of the bar and the angle member in the channel.

11. A mechanism as claimed in claim 8, wherein two shoulders are provided on the bar in such positions that limitation of the relative movement of the angle member and the bar in each direction is provided by interengagement of one of the two parallel free edges of the abutment plate, one of the rollers and one of the shoulders.

12. A mechanism as claimed in claim 8, including spring means for urging the rollers towards the central plane of the bar.

13. A mechanism as claimed in claim 1 wherein said rolling means is a ball.

14. A mechanism as claimed in claim 1 wherein said rolling means is a roller.

* * * * *